United States Patent [19]
Cestonaro et al.

[11] Patent Number: 5,827,166
[45] Date of Patent: Oct. 27, 1998

[54] DEVICE FOR JOINING STRIPS OF A FLEXIBLE MATERIAL

[75] Inventors: Jean Cestonaro, Marin, France; Jean-Luc Mathon, St.-Blaise, Switzerland

[73] Assignee: Philip Morris Incorporated, New York, N.Y.

[21] Appl. No.: 355,937

[22] Filed: Dec. 14, 1994

[30] Foreign Application Priority Data

Dec. 16, 1993 [EP] European Pat. Off. ............. 93810887
Dec. 16, 1993 [EP] European Pat. Off. ............. 93810888

[51] Int. Cl.⁶ ............................ B65H 19/18; B65H 19/20
[52] U.S. Cl. ......................... 493/344; 493/346; 156/504; 156/518; 156/582
[58] Field of Search ................................... 493/374, 378, 493/379, 380, 381, 384, 343, 344, 345, 346, 350; 156/562, 504, 518, 581, 582

[56] References Cited

U.S. PATENT DOCUMENTS

| | | | |
|---|---|---|---|
| 4,138,047 | 2/1979 | Sherman | 226/7 |
| 4,878,982 | 11/1989 | Ogata et al. | 156/361 |
| 4,995,406 | 2/1991 | da Silva | 131/105 |
| 5,018,535 | 5/1991 | Da Silva et al. | 131/60 |
| 5,169,082 | 12/1992 | da Silva et al. | 243/58.1 |
| 5,269,471 | 12/1993 | Yamagishi | 241/27 |
| 5,316,230 | 5/1994 | Focke et al. | 242/58.1 |

FOREIGN PATENT DOCUMENTS

| | | |
|---|---|---|
| 0 395 029 A2 | 10/1990 | European Pat. Off. . |
| 0 446 901 A2 | 9/1991 | European Pat. Off. . |
| WO 90/03324 | 4/1990 | WIPO . |
| WO 91/17943 | 11/1991 | WIPO . |
| WO 92/11194 | 7/1992 | WIPO . |

*Primary Examiner*—Joseph J. Hail, III
*Assistant Examiner*—Christopher W. Day
*Attorney, Agent, or Firm*—James T. Moore; James E. Schardt; Charles E. B. Glenn

[57] ABSTRACT

A device is provided to join the lower end of a strip of paper coming from a nearly-empty reel to the upper end of another strip of paper coming from a full reel. The joining device comprises a rotating striking arm equipped with a hammer on one of its ends and with a cam on the other end. When the join between two strips is to be made, a jack actuates a castor which butts against the cam, thus bringing a striking surface of the hammer closer to the strips to compress and join the strips. The device further comprises a front and a rear cutting fixture permitting the remaining ends of the strips of paper to be cut on either side of the join. Air bearings are provided to guide one or both strips.

13 Claims, 11 Drawing Sheets

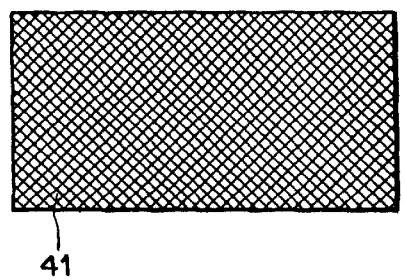
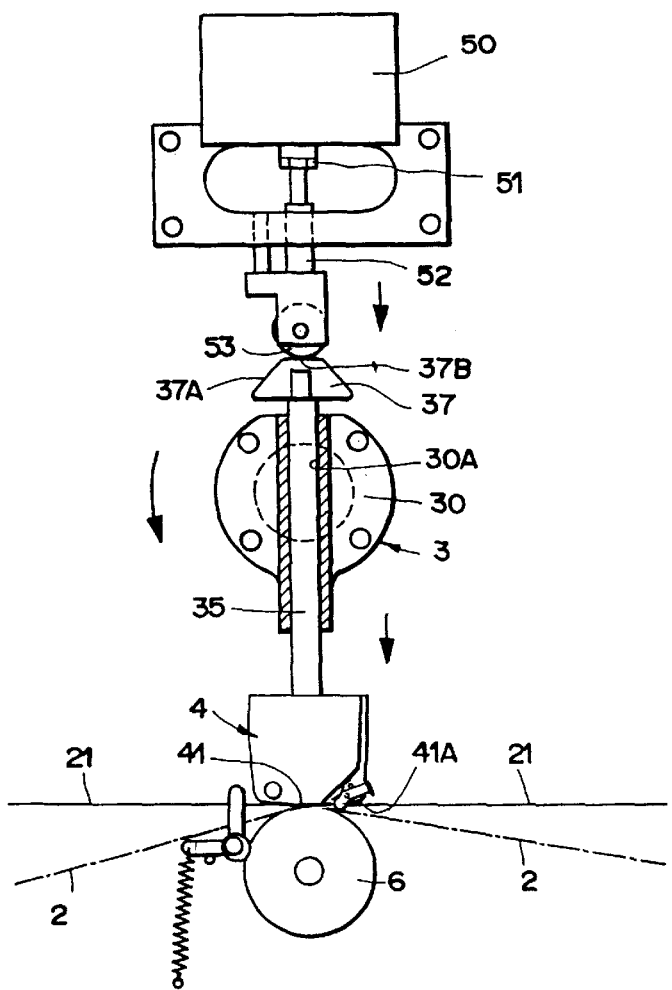
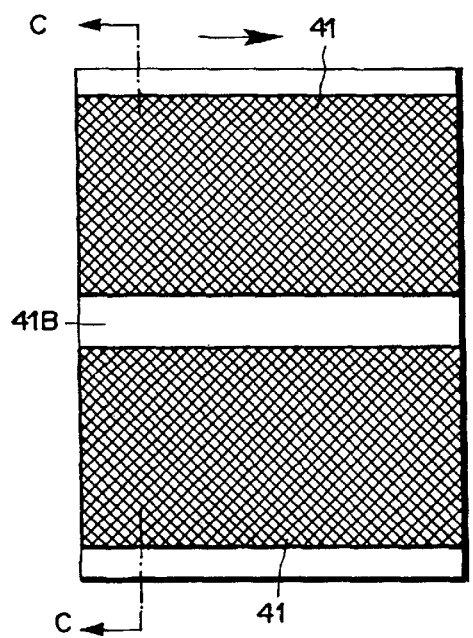
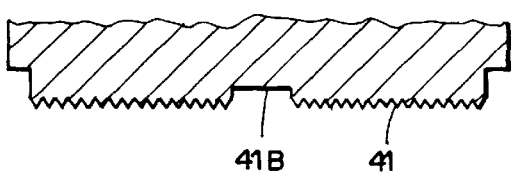
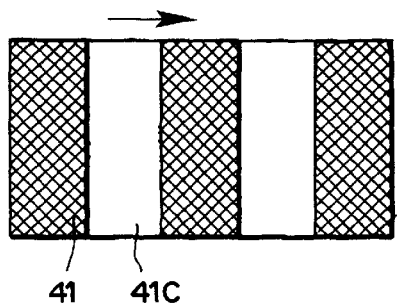

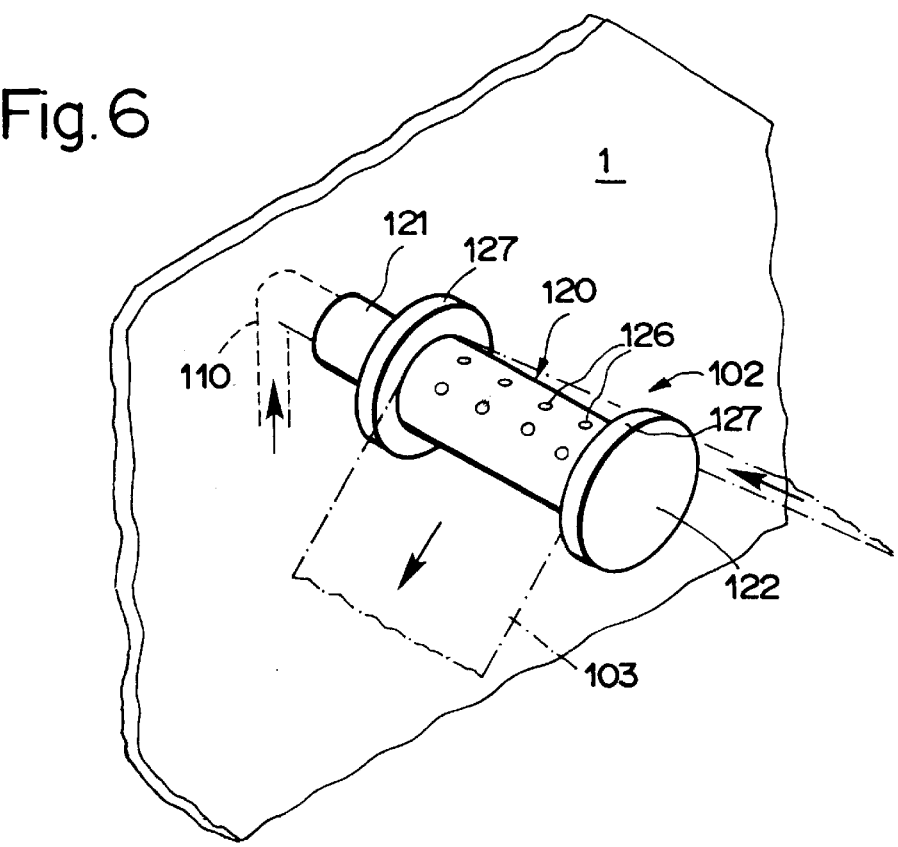
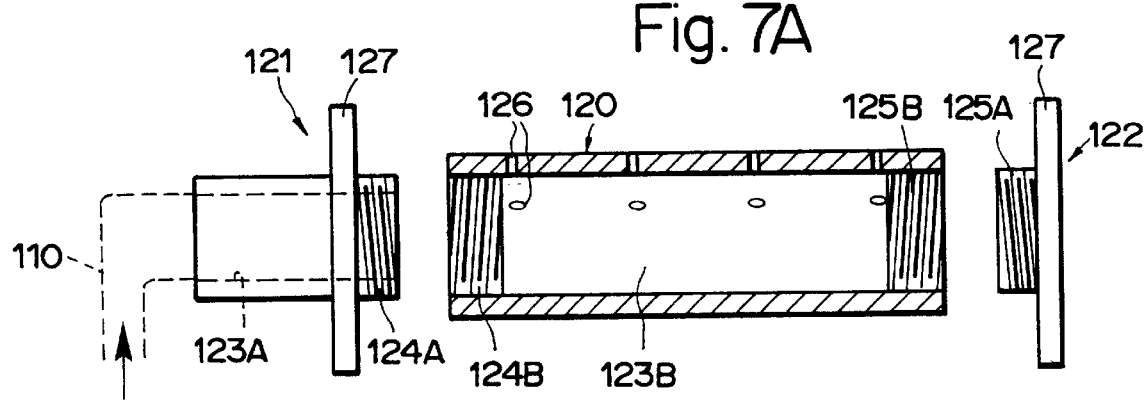
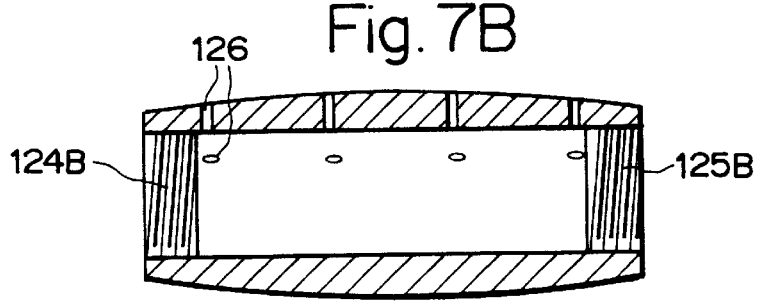
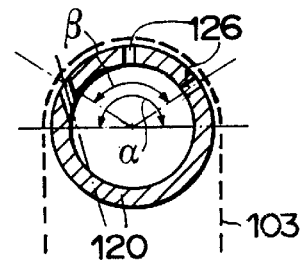

DEVICE FOR JOINING STRIPS OF A FLEXIBLE MATERIAL

PRIORITY APPLICATIONS

The present application claims priority from European patent applications 93810887.5, filed Dec. 16, 1993, and 93810888.3, filed Dec. 16, 1993 which are hereby incorporated by reference.

BACKGROUND OF THE INVENTION

1. Technical Field of the Invention

The present invention relates to a device for joining strips of a flexible material end to end; particularly strips of paper used especially in the cigarette manufacturing industry, and from which the cigarette paper surrounding the rod of tobacco or the tipping paper surrounding the cigarette filter is obtained.

2. Discussion of the Related Art

Devices are generally known in the art for joining end to end strips of a flexible material, a certain number of documents relating to this art being cited below. Patent EP-A-0.318.427 (U.S. Pat. No. 5,018,535) describes a process and a device permitting the operation of joining strips of cigarette paper to be carried out, and also describes the operations which directly precede that of joining of interest here, i.e., the exchanges of reels, preparation of the full reel, and bringing the end of the top turn of the full reel opposite the joining device. By reason of its principle, the aforementioned device works on the joining when the two strips of paper are immobile, which necessitates either stopping the production machine during this operation, or providing an accumulation device permitting a reserve of paper-strip length to be produced, which reserve is used up by the cigarette-making machine during stopping of the strip for joining. This is a significant drawback of this device, as well as of all those which operate during stopping since, taking into account the times of deceleration, stopping, and acceleration, and if it is desired that the production always be able to continue at the same rate, it is necessary to provide for a very sizable reserve of length, which necessitate a bulky and delicate machine. Generally, a compromise is chosen by creating a less sizable reserve of length and accepting a lowering of the rate of production of the cigarette-making machine. There is then a reduction in productivity which may be significant.

The process and the device described in application EP-A-0.475.886 (U.S. Pat. No. 5,169,082) permit joining of the strips of paper when the latter are moving; however, this device is more particularly provided for joining the strips of paper from which the tipping paper is obtained, i.e., that surrounding the filter tips. This device comprises in particular two rollers, a male roller and a female roller, notches of which interpenetrate one another in order to obtain joining by tongues torn in the webs of paper. Such a device is limited to use with certain types of papers. Other known devices require inserting a piece of adhesive tape between the two strip portions to be assembled; the drawback of these devices is obvious since the presence of an operator is necessary to prepare and dispose the pieces of adhesive.

Besides the operation of joining the strips of paper, it is necessary to provide operations for cutting the unused strips of paper on both sides of the join. The devices described above comprise cutting mechanisms independent of the mechanisms used for joining, thus necessitating complex synchronization systems, at least for the cases where the joins take place at a certain speed. Patent EP-A-0.331.634 (U.S. Pat. No. 4,995,406) discloses a process and a device for opening a full reel and preparation of the end of the top turn for joining, whereas application EP-A-0.509.958 (U.S. Pat. No. 5,269,471) describes a process and a device permitting the transfer of bobbins or reels being paid out.

Patent EP-A-0.318.427 (U.S. Pat. No. 5,018,535), discussed above, describes a process and a device permitting the operation of joining strips of paper to be carried out in the cigarette industry. If it is desired that the production always be able to continue at the same rate, it is necessary to provide for a very sizable reserve of length. Generally, this reserve of length is obtained in an accumulation device, as shown, for example, in application EP-A-0.395.029, generally composed of two aligned rows of pulleys, generally about twenty per row, the two rows being disposed facing one another, the web passing alternately behind a pulley of one row, then behind a pulley of the other row, the reserve of length being obtained by moving the two rows of pulleys apart, this same reserve being used up by moving the two rows of pulleys together. The drawbacks of such an accumulation device come from the vibrations introduced by rotating elements, the inertia of each pulley at the time of the variations in speed, as well as the resistance to rolling offered by each pulley; even if the latter are of careful construction, each one exerts a certain force of resistance upon the web of paper, this force progressively increasing with time because of the wear and tear on the bearings, as well as their becoming dirty due to the dust. The force of resistance exerted on the web of paper at the output of the device, being equal to the sum of the forces of resistance offered by each pulley, comes to be excessive, leading to tearing of the web of paper. Generally, a compromise is chosen by creating a less sizable reserve of length and accepting a lowering of the rate of production of the cigarette-making machine. There is then a reduction in productivity which may be not inconsiderable. Another way of compensating for the mentioned drawback consists in considerably increasing the possible gap between the two rows of pulleys, thus increasing the strip's route length between two pulleys; this way of proceeding leads to excessive bulk of the machine, as well as to instability of guidance of the web of paper. Another drawback of the devices comes from the expensive maintenance necessitated by these numerous pulleys. Apart from the pulley-type reversing devices described above, those made up solely of a fixed bar are known, generally of circular cross-section, over a portion of the outside surface of which a flexible strip passes. Although these devices are clearly simpler than the pulley types, they have the drawback of wearing out very quickly, as well as of abrading the strip at the time of each reversal. Moreover, in view of the significant friction of the strip on the bar, they cannot be used for a fragile strip like a strip of thin paper.

OBJECTS OF THE INVENTION

Thus, objects of the invention include providing a device for joining strips of paper, or more generally a flexible material, not encountering the drawbacks of those of the previous art, i.e., by which a reliable join may be obtained, the join being effected when the strip is unwinding at its nominal speed, usable in particular for a wide variety of types of flexible materials, this joining device being able to operate completely automatically.

Another object of the invention is to provide that the above joining device be directly equipped with cutting mechanisms, or directly controlling the cutting mechanisms, in order that the parts of strips to be eliminated may be cut precisely, without needing complex and delicate synchronization systems.

Another object of the invention is to propose an accumulation device for a strip of paper which, being equipped with the preceding reversers, does not encounter the mentioned drawbacks of the known devices.

Another object of the invention is to provide a reversing device for a flexible strip, especially usable for a strip of thin paper, offering extremely low frictional resistance and requiring only minimal maintenance. In this way, it is not necessary to slow down or stop the strips for their joining.

SUMMARY OF THE INVENTION

A device is provided to join the lower end of a strip of paper coming from a nearly-empty reel to the upper end of another strip of paper coming from a full reel. The joining device comprises a rotating striking arm equipped with a hammer on one of its ends and with a cam on the other end. When the join between two strips is to be made, a jack actuates a castor which butts against the cam, thus bringing a striking surface of the hammer closer to the strips to compress and join the strips. The device further comprises a front and a rear cutting fixture permitting the remaining ends of the strips of paper to be cut on either side of the join. Air bearings are provided to guide one or both strips.

BRIEF DESCRIPTION OF THE DRAWINGS

By way of example of embodiments of a device according to the invention, one may refer to the detailed description which follows in comparison with the appended drawing comprising the figures in which:

FIG. 3 shows the same view as that of FIG. 1, the device being in position for the joining, FIG. 4A shows a view of a first embodiment of the lower surface of the hammer, FIG. 4B shows a view of a second embodiment of the lower surface of the hammer, FIG. 4C shows a section along the line C—C of the preceding figure, FIG. 4D shows a view of a third embodiment of the lower surface of the hammer, FIG. 6 shows a perspective view of an embodiment of a reversing device according to the invention, FIG. 7A shows a longitudinal section of the device of FIG. 6, FIG. 7B shows a longitudinal section of another embodiment of part of a reversing device according to the invention, FIG. 7C shows a cross-section of the devices of the preceding figures.

BRIEF DESCRIPTION OF THE PREFERRED EMBODIMENTS

Figure 1:
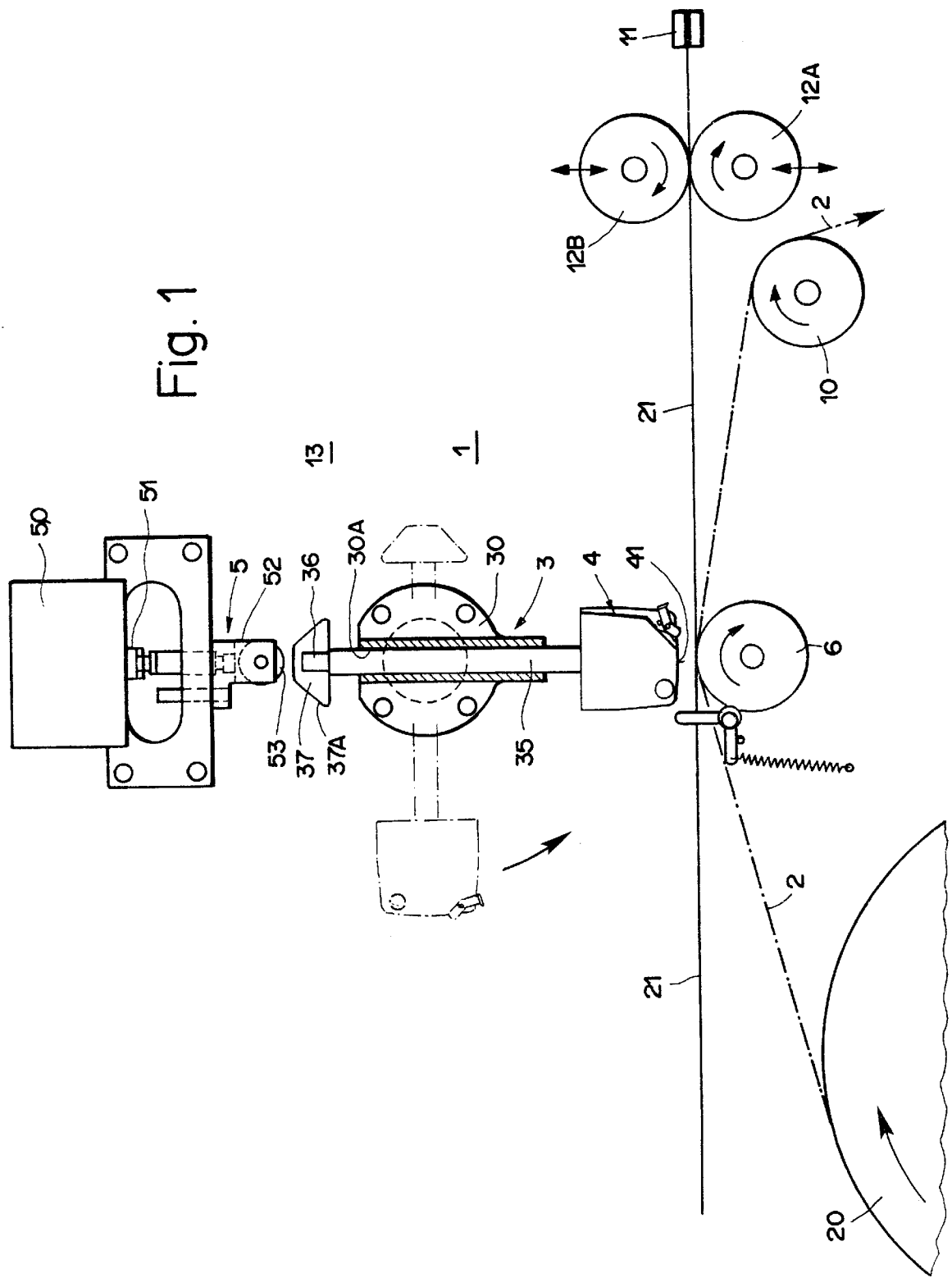
FIG. 1 shows a front view of the device according to the invention.

In FIG. 1, there is a machine portion 1 responsible for continuously supplying a strip of paper 2 to a cigarette-making machine (not shown) disposed downstream from the machine portion shown here. This device may also be used for joining strips of numerous products coming in this form, e.g., smooth or creped paper, glazed, varnished, lacquered paper, composite products such as paper or another material covered with a layer of aluminum, for example, synthetic films, e.g., of cellophane or polypropylene, nonwoven materials, or even entirely metallic thin strips such as strips of aluminum, these materials being able to have other uses than those previously mentioned, being usable, for example, for packing purposes or as constituents of part of the cigarette, e.g., the filter. According to the uses, these webs may bear an imprint on one or both faces.

The strip of paper comes from a reel 20, fixed by a first shaft (not shown) to the machine portion 1 and rotating about this shaft, the strip of paper 2 unwinding from the top turn of the reel 20, passing over at least one join roller 6, the function of which will be explained below, and at least one guide roller 10. When the reel 20 is nearly empty, known reel transfer mechanisms, e.g., those described in application EP-A-0.509.958 (U.S. Pat. No. 5,269,471), have moved the reel 20 toward a second rotation shaft and loaded a full reel on the first rotation shaft, while another known device, e.g., one of those described in patent EP-A-0.331.634 (U.S. Pat. No. 4,995,406) or application EP-A-0.475.886 (U.S. Pat. No. 5,169,082), has opened the full reel, after which another grasping and conveying device, diagrammed by the clamp 11 in FIG. 1, has gone to withdraw the top end of the strip of paper 21 from the full reel, then has taken it away, passing over the strip of paper 2 and between two driving rollers 12A and 12B, capable of moving apart to allow the passage of the clamp 11, then of moving together and driving the strip of paper 21 at the same speed of longitudinal movement as the speed of movement of the strip of paper 2. The grasping and conveying device, as well as the operations mentioned just above, are described in particular in patent EP-A-0.318.427 (U.S. Pat. No. 5,018,535). The devices and mechanisms mentioned above being sufficiently described in the prior art, in particular in the documents cited, and are not described more precisely here. FIG. 1 shows only the mentioned elements placed in immediate proximity to the device according to the invention, the strips of paper 2 and 21 being in position to be joined.

Figure 2:
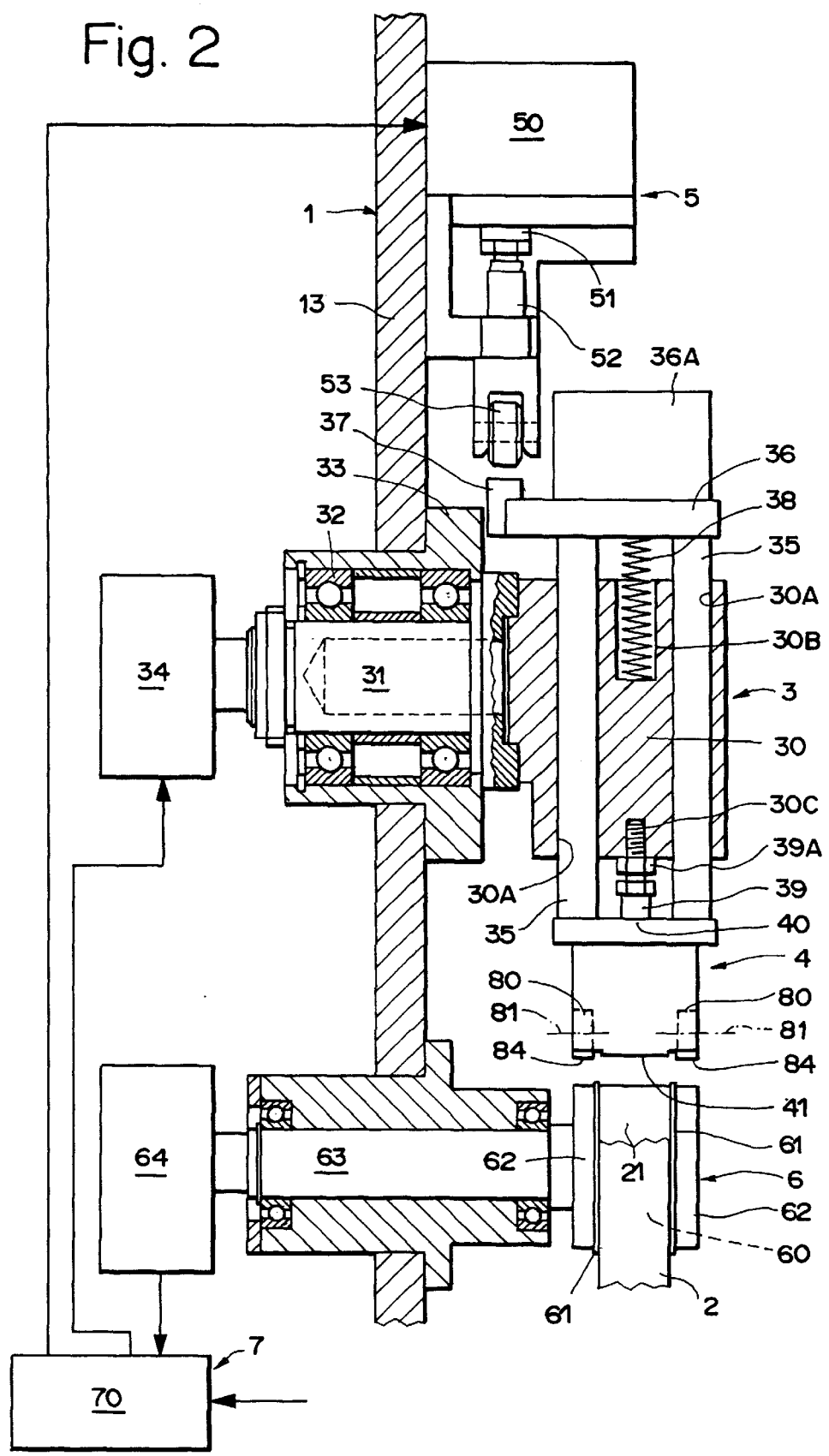
FIG. 2 shows a side view of the device of FIG. 1.

The device according to the invention is made up principally of a striking arm 3, which may be caused to rotate and supports a hammer 4, a striking-control device 5, a join roller 6, and control mechanisms 7. The way in which these different elements are mounted on a wall 13 of the machine portion 1 is shown in FIG. 2. The striking arm 3 includes first of all a rotary support 30 connected to a rotation shaft 31 pivoting within ball bearings 32 disposed within a socket 33 fixed to the wall 13. The rotation shaft 31 is driven rotatingly by motor 34 capable, on command, of driving the assembly of the striking arm 3 rotatingly at a given speed or of holding it in a given angular resting position. The striking arm 3 further includes a striking device made up of two rods 35 capable of sliding in two cylindrical hollows 30A of the rotary support 30, contrived in the latter at a direction perpendicular to its axis of rotation, the upper ends (in the figure) of the rods being joined by a connection bar 36 comprising a cam 37 on its rearward end. The other ends of the rods 35 are fixed to a hammer 4. One end of a spring 38 is lodged in a hole 30B made in a portion of the rotary support facing the connection bar 36, the other end of the spring pressing on this connection bar, so as to tend to push the assembly of the striking arm 3 and the hammer 4 back upward in FIGS. 1 and 2. A mechanical stop device 39 is mounted in opposition to the spring 38, preferably made up of a rod portion, one end of which is threaded and is fixed to the inside of a tapped hole 30C made in the rotary support 30, along a common axis with that of the hole 30B, the upper face 40 of the hammer 4 coming to butt against the other end of the rod. The position of the end of the rod acting as a stop is adjustable by means of a bolt 39A. Thus, in resting position, as shown in FIGS. 1 and 2, the striking arm 3 and the hammer 4 are in retracted position, being pushed back by the spring 38, sliding by the rods 35 in the cylindrical hollows 30A, the exact position of the striking arm 3, or of the hammer 4, being determined by the stop 39. In this retracted position, the lower face 41 of the hammer 4 is separated from the join roller 6 by a slight space, while the cam 37 is separated from the striking device 5 by another space; in this way, the striking arm 3 driving the hammer 4 can pivot with the rotation shaft 31, being driven by the motor 34, without interfering with the striking device 5 or the join roller 6. It is seen in FIG. 2 that the cam 37 is shifted so as to permit this rotation. In view of the high speed of rotation of the striking arm 3, as will be seen below, and in view of the relatively great mass of the hammer 4, it is necessary to balance the striking arm 3 in order to compensate for the centrifugal force which is exerted on the hammer 4. For this purpose, a solid balance piece 36A may be fixed to the connection bar, or else the spring 38 may be sufficiently strong so that when the system is rotating, the striking arm 3 remains in resting position, i.e., face 40 of the hammer butting against the stop 39.

The striking device 5 is made up of a chassis 50, secured to the wall 13 of the machine 1, the chassis 50 supporting a jack 51, preferably pneumatic, the piston of which actuates a rod 52 provided with a castor 53 fixed to its free end by means of a stirrup. When the jack 51 is not actuated, the castor 53 is in retracted position, as in FIGS. 1 and 2. In working position, the castor 53 rests on the cam 37 and acts upon the assembly of the pivoting arm 3, in opposition to the effect exerted by the spring 38, causing the rods 35 to slide and pushing the hammer 4 until its lower face 41 is in contact with the strips of paper 21 and 2 resting one upon the other and on the join roller 6.

The lower face 41 of the hammer 4 includes embossed grooving or knurling, as shown by way of example in FIG. 4A, preferably made up of two perpendicular networks of parallel grooving, spaced from one another by a distance of from 1 to 2 mm. Other types of grooving or other sizes thereof might also be envisaged. The arrows in FIGS. 4A, 4B, and 4D indicate the direction of movement of the lower face 41.

FIGS. 4B and 4C show two views of another embodiment of the lower face 41, where the latter is separated into two portions by a longitudinal groove 41B. It is well understood that the lower face may be separated into more than two portions, each of them being separated by a longitudinal groove. Such an embodiment permits reducing the necessary pressing force and is particularly appropriate for the joining of strips of significant width, as, for example, strips of paper or other material for packing.

FIG. 4D shows another embodiment of the lower face 41, the latter being separated into several portions by one or more grooves 41C perpendicular to the direction of movement of the lower face. This embodiment is particularly appropriate for the joining of relatively rigid strips, in order to keep a sufficient flexibility of the portion where the two strips are super imposed at the join, particularly in case the strips must pass around one or more pulleys of relatively small diameter.

The above embodiments can be combined to have a lower face 41 separated into several portions by one or more longitudinal grooves 41B and one or more transverse grooves 41C.

The join roller 6 includes a smooth cylindrical peripheral resting surface 60, on which the lower face of the strip of paper 2 rests, the two superimposed strips of paper being guided on this surface by two circular guide ribs 61 defining the sides of the resting surface 60. Two other resting surfaces 62 are provided on either side of the resting surface 60, their function being explained below. The join roller 6 is connected to a rotating shaft 63, set in rotation by motor 64. As previously, the shaft 63 pivots within ball bearings, the outer mountings of which are fixed relative to the wall 13.

As will be seen later, the joining operation imposes significant shocks on the device, mainly on the shaft 63. Particular precautions, known to those skilled in the art, are therefore to be taken in order that this shaft may not be damaged and that the rotary movement of the join roller 6 remains steady.

The course of the process of joining the two strips of paper 2 and 21 will now be described.

In resting position, the striking arm 3 is as shown in FIG. 1, i.e., in retracted position. Preferably, it will be oriented perpendicular to the position shown in the figure, as suggested in broken lines, so as to leave a maximum of space above the join roller 6 for bringing the end of the new strip of paper 21. As mentioned above, known mechanisms have detected that the reel 20 feeding the cigarette machine would soon be empty, have brought the free end of the strip of paper 21 over the join roller 6, in superposition with the strip of paper 2. All these operations, as well as those which are about to follow, take place when the cigarette machine is operating according to its nominal rate, i.e., when the strip of paper 2 is traveling at nominal speed, without its being necessary to slow it down. The strip of paper 21 coming from the full reel is also driven, by the rollers 12A and 12B, at the same speed of movement as the strip 2, these two strips being able to be in contact on a peripheral portion of the join roller 6 since then there is no slipping between these two strips of paper.

When the sensors mentioned above detect that only a few turns of the strip of paper 2 remain on the reel 20, a signal is transmitted to the control unit 70, which in turn controls the rotation-starting motor 34 of the striking arm 3; the latter then starts to rotate on its shaft 31, the driving motor 34 accelerating this movement until the tangential speed of the lower face 41 of the hammer 4 reaches the speed of travel of the two strips of paper 2 and 21. During this rotary movement, the striking arm 3 is still in retracted position, i.e., it can pivot freely on its shaft 31. When this speed of rotation is reached, and the rotation arm is in an angular position approximately corresponding to that shown in broken lines in FIG. 1, and momentarily having its cam 37 disengaged from the castor 53, the control unit 70 abruptly actuates the jack 51 so as to lower its rod 52 and the castor 53 which this rod bears at its lower end. As is seen in FIG. 3, the striking arm 3, which has continued its rotary movement, has come in contact with the castor 53 via the driving face 37A of the cam 37, thus lowering (relative to FIG. 3) the assembly of the striking arm 3, causing the hammer 4, and particularly its lower face 41, to press hard on the upper face of the strip of paper 21. In fact, this movement is not selective but is effected during a part of a revolution of the striking arm 3 (as illustrated, e.g. by the arcuate arrow in FIG. 1 showing an example of an arcuate path for a striking device), the length of the zone of action 37B of the cam 37 being such that, at the time of the rotary movement, when the front portion 41A of the lower face 41 of the hammer 4 arrives in immediate proximity to the two strips of paper 2 and 21, the striking arm 3 is completely driven in, and the lower face 41 strikes and strongly compresses the two strips of paper 2 and 21 against one another, the pressing resistance being supplied by the join roller 6, during part of a revolution of the striking arm 3 corresponding to the length of the lower face 41. During this passage, the two strips of paper 2 and 21 are therefore strongly compressed between the lower face 41 of the hammer 4 and the peripheral resting surface 60 of the join roller 6, this compressive effect being further amplified by the grooving of the lower face 41, as described above. Thereby, the two strips of paper 2 and 21 are therefore closely united to one another over a portion of length 22.

Simultaneously with this operation of joining the two strips of paper 2 and 21, it is necessary to cut the strip of paper 21 in front of the join, as well as the strip of paper 2 behind the join, in order to have only a single strip, being paid out from the full reel and feeding the cigarette machine. For this purpose, reference may be made to FIGS. 5A to 5E, which describe different phases of the joining and cutting operations. As is seen in these figures, the hammer 4 is provided with a front cutting fixture 8, while a rear cutting fixture 9 is disposed immediately behind the join roller 6. The front cutting fixture 8 is composed principally of two bent levers 80 pivoting about an axis 81, disposed on the two side faces of the hammer 4 (see FIG. 2), the front ends 82 of the levers being connected by a cutting blade 83, while the rearward ends of the same levers are shaped as resting surfaces 84. The front cutting fixture is supplemented by two springs 85, one on each face of the hammer 4, and acting on each lever 80 is such a way as to keep the cutting blade 83 in raised position. This raised position is determined by two stops 86.

Figure 5A:
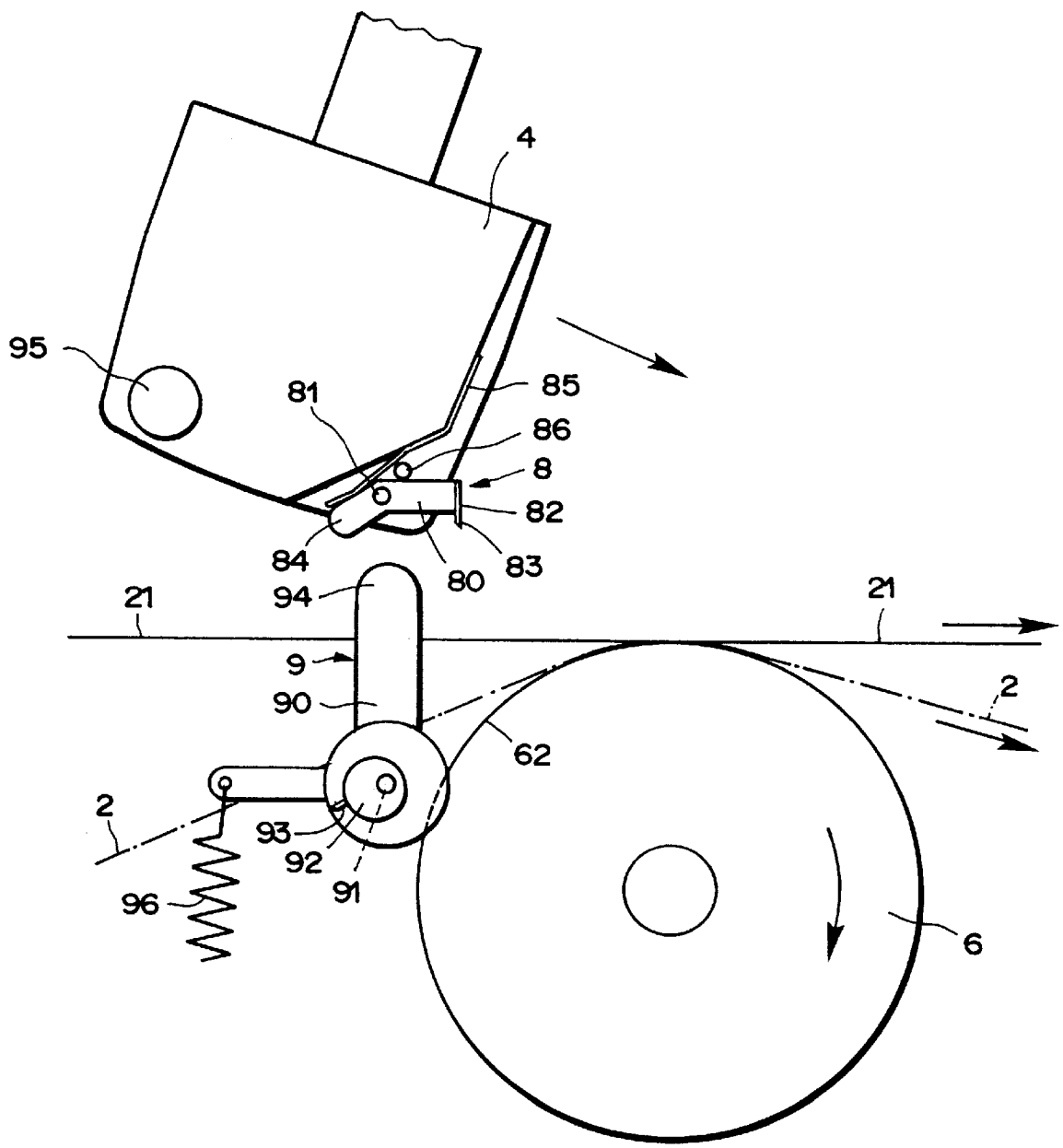
FIGS. 5A, 5B, 5C, 5D and 5E show different steps in the operations of joining and cutting.
Figure 5B:
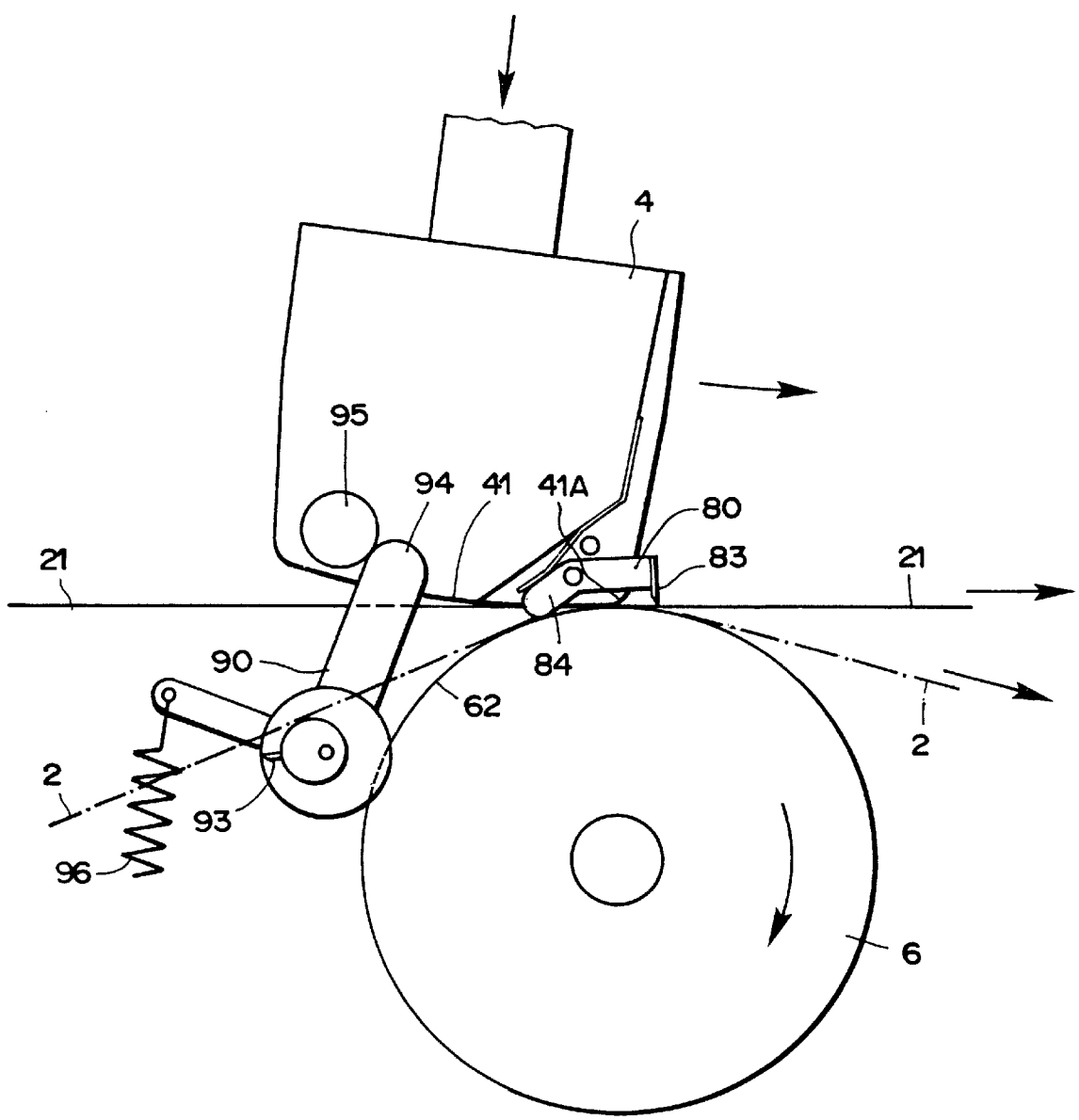
Figure 5C:
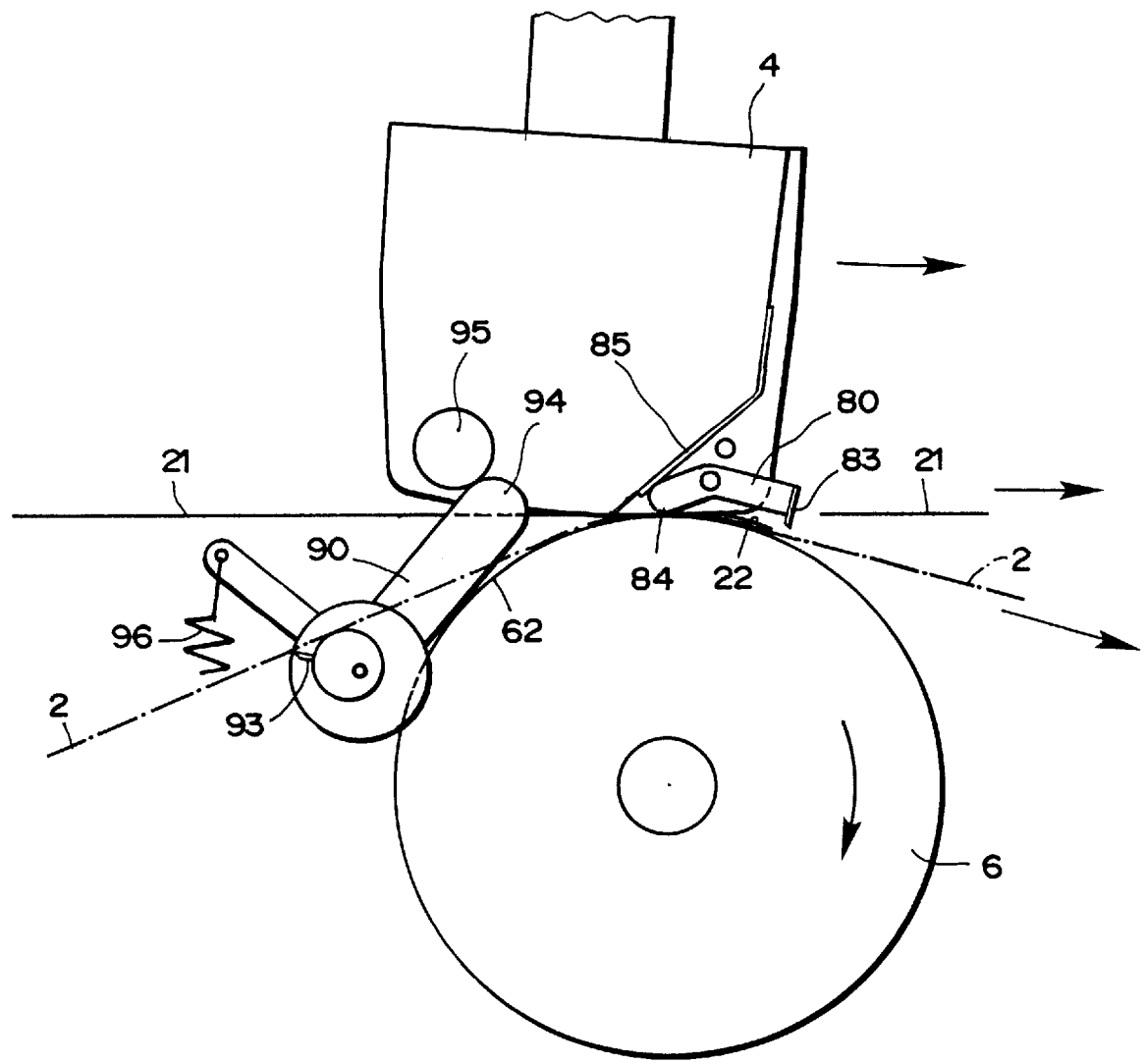
Figure 5D:
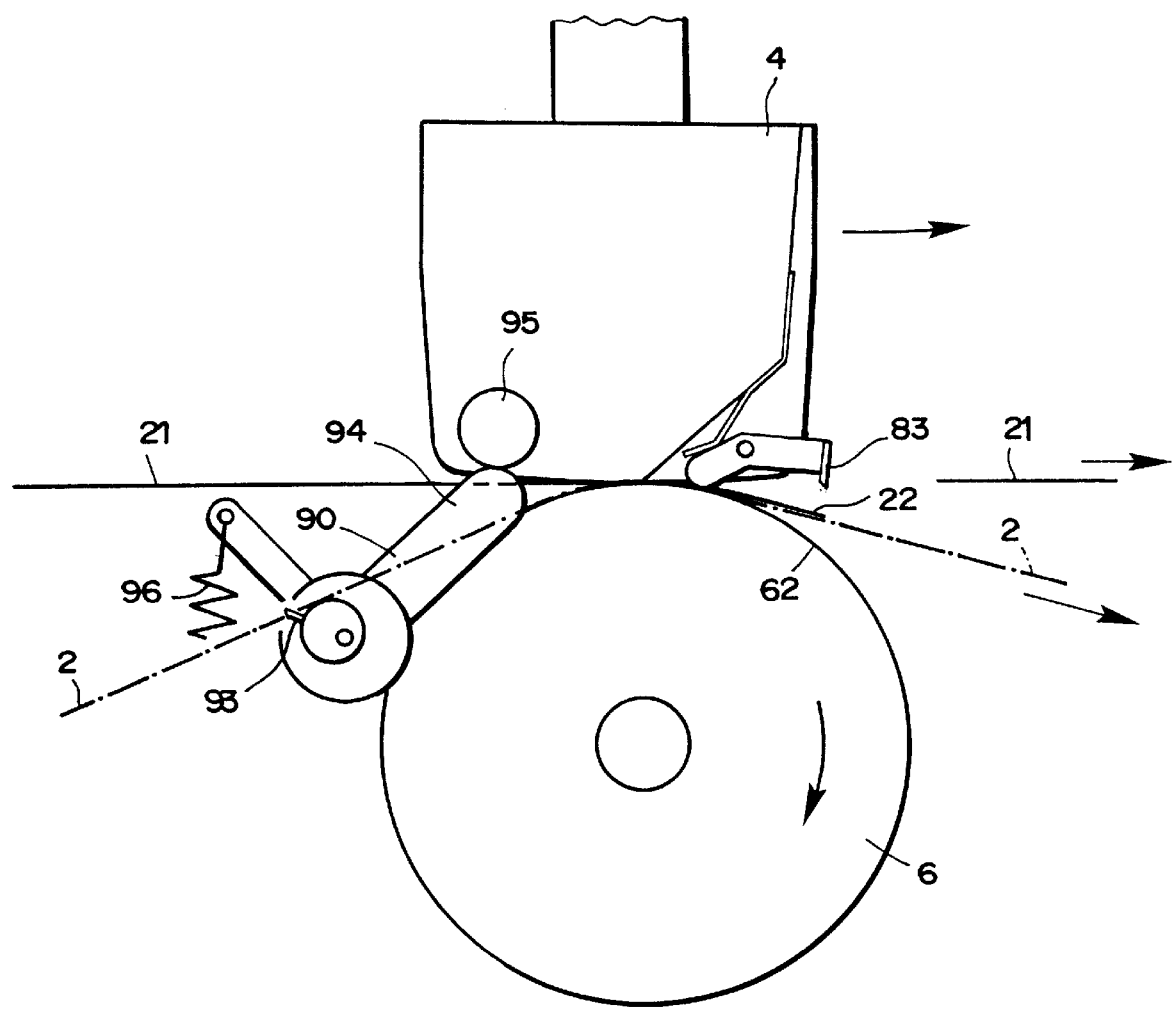

The rear cutting fixture 9 is composed principally of a lever 90 disposed on one side of the strips of paper 2 and 21, pivoting about an axis 91, slightly to the rear of and parallel to the axis of rotation of the join roller 6. This lever 90 comprises a portion 92, supporting a cutting blade 93 disposed across and under the strip of paper 2. The end 94 of the lever 90 is intended to be actuated by a rod portion 95, projecting from the side face of the hammer 4, in a way described below. Spring 96 keep the lever 90 in position as shown in FIG. 5A. It would also be possible for the blade 93 to be supported by two levers 90 disposed symmetrically on each side of the strips of paper and controlled by two rod portions 95 disposed on the two opposite side faces of the hammer 4. Seen in FIG. 5A are the two strips of paper 2 and 21 unwinding at the same speed, resting on the join roller 6, as well as the hammer 4, still in retracted position, which is approaching through its rotary movement. The front 8 and rear 9 cutting fixtures are also in retracted position. In FIG. 5B, the hammer 4 has been lowered in the way described above, so that the front portion 41A of its lower face 41 arrives in contact with the upper face of the strip of paper 21 and starts its joining with the strip of paper 2. At this moment, the resting surfaces 84 of the bent levers 80, which extend slightly beyond the envelope constituted by the surface 41, come in contact with the peripheral contact surfaces 62 of the join roller 6, but without sufficiently lowering the blade 83 which is not yet in contact with the strip of paper 21. It will also be noticed that the rod portion 95 has begun to act upon the end 94 of the lever 90, but without the contact as yet being established between the blade 93 and the strip of paper 2. In FIG. 5C, the hammer 4 has further advanced, a first joining portion 22 of the two strips of paper 2 and 21 has already been effected, the resting surfaces 84 of the bent levers 80 are resting directly against the peripheral resting surfaces 62 of the join roller 6, thus lowering the blade 83 and cutting the strip of paper 21 directly in front of the beginning of the join. The lever 90, too, continues its movement, but without the blade 93 being active as yet. FIG. 5D shows the same device a moment later, a greater length of join having been effected, the resting surfaces 84 are disengaging from the peripheral resting surface 62, whereby the blade 83, acted upon by the spring 85, starts to be lifted, whereas now the end 94 of the lever 90 is completely engaged by the rod portion 95, causing the blade 93 to cut the strip of paper 2 in a position behind the join 22, while the latter is not yet finished.

Figure 5E:
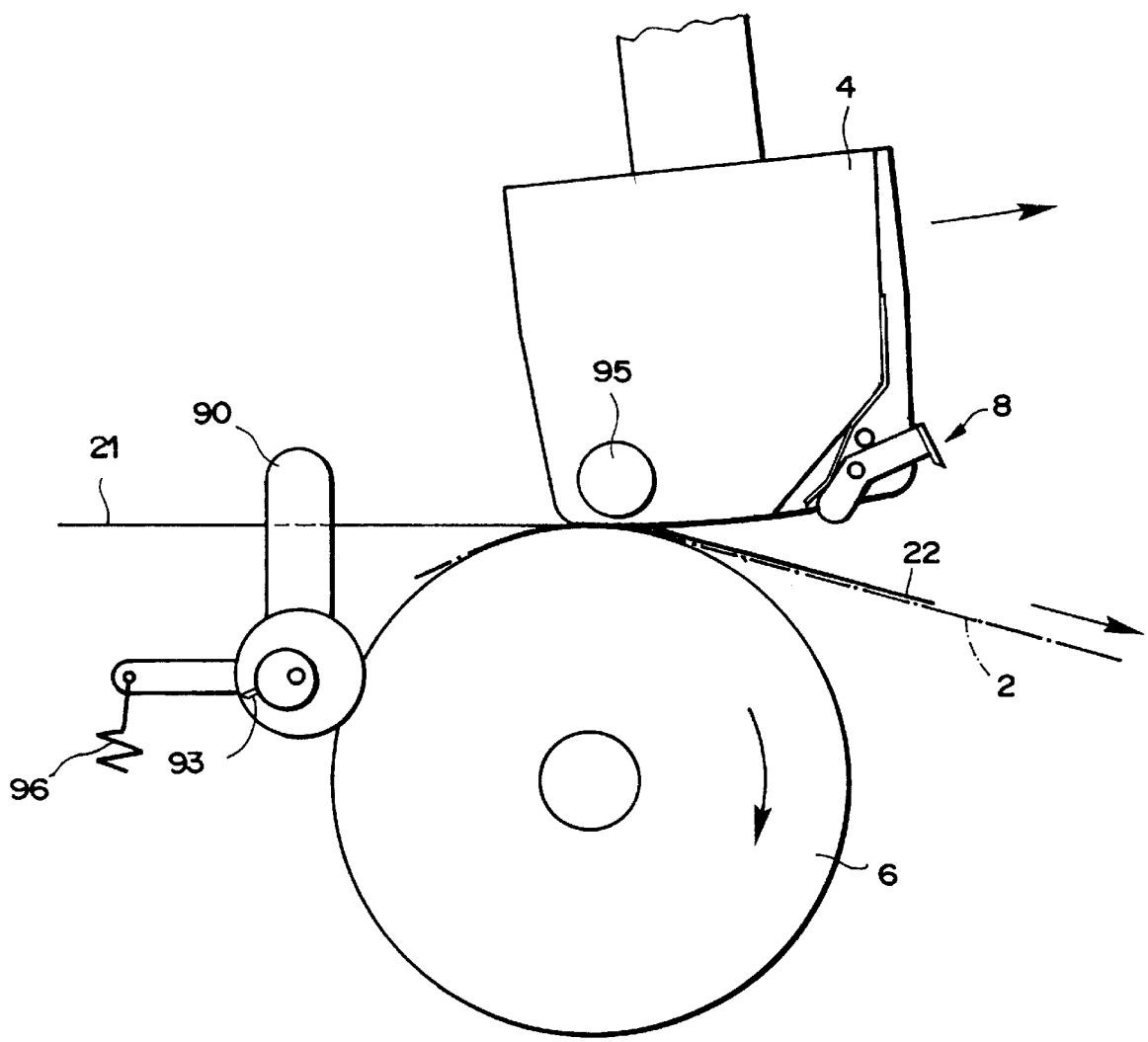

The end of the joining and cutting operations is shown in FIG. 5E, where the hammer 4 is in a position where it is finishing the join 22 of the two strips of paper, the latter having already been cut, the front cutting fixture 8 has been completely lifted, whereas the lever 90 has been disengaged from the rod portion 95 and has been returned to resting position, acted upon by the spring 96. Immediately after this step, the cam 37 will be disengaged from the castor 53, the hammer 4 then resuming its retracted position, under the effect of the spring 38.

The rotary movement of the striking arm 3 may now be stopped, this deceleration being practicable over several revolutions before the arm 3 resumes its resting position. At the same time, the cut ends of the strips of paper 2 and 21 are eliminated by the known mechanisms described in one or the other of the publications mentioned previously. It only remains to recommence the cycle described above when the sensors have detected that the new reel is almost empty.

As those skilled in the art may realize, certain precautions are to be taken in order to obtain proper and reliable joining of the two strips of paper; in particular, the control system 7, via the control unit, must be able to ensure that the peripheral speed imposed at the lower face 41 of the hammer 4 is equal to that of the two strips of paper 2 and 21. This may be done by comparing signals indicating the speed of strips of paper, for example, coming from the motor 64 of the join roller 6 and the motor 34 of the striking arm 3. Likewise, the order for activating the jack 51 must be able to be sent when the striking arm 3 is in a fairly specific position, indicated either by an independent sensor or on the motor 64. The motor 34 and 64 may be of any suitable type, their synchronization being obtainable by mechanical and/or electronic systems.

The position of the lower face 41 of the hammer 4 in position of extension must be precisely situated relative to the resting surface 60 of the roller 6 in order to effect proper and reliable joining of the two strips of paper, this relative position being determined by the relative positions of the castor 53 and the surface of the action zone 37B of the cam 37. For this purpose, the striking arm 3 is positioned in such a way that the lower face 41 is secant to the resting surface 60 of the roller 6 on the order of 1 to 2 mm when these two surfaces are in contact; this difference of 1 to 2 mm may be absorbed by the air cushion of the jack 51, thus permitting the striking arm 3 to be raised in proportion, seeing that the lower face 41 can only be tangent to the strip of paper 21. The front attack edge 41A of the hammer 4 is rounded so as to permit this slight movement of the hammer when the latter arrives in contact with the strips of paper on the join roller 6. The over pressure thus developed further increases the pressure of the lower face 41 on the strips of paper and on the resting surface 60. The very high pressure developed by the two generatrices of the surfaces 41 and 60 cooperating at a given moment with a pressing force on the order of 200 kg for a width of paper on the order of 50 mm, this pressure being further locally increased by the grooving of the surface 41, permits a close connection of the two strips of paper which might be likened to cold welding. The separation of the surface 41 into several portions (FIGS. 4B and 4C) may permit the pressing force to be limited for strips of significant width.

As a variant, it would also be possible to install the rest-roller 6 on a shaft 63 mounted on resilient supports capable of absorbing this position difference of 1 to 2 mm.

Apart from the adjustments mentioned above, the device according to the invention needs no adjustment of the co-ordination of the cutting mechanisms since the latter are directly controlled by the movement of the hammer 4.

The joining device has been described here according to a configuration where the strips of paper 2 and 21 travel in approximately horizontal planes; it is obvious that it would operate in the same way for a movement of the strips of paper in an approximately vertical plane; in this case, the figures should be pivoted by a quarter of a turn, in one direction or the other. In fact, the angle at which the strips of paper are situated depends firstly upon the general configuration of the machine, and are therefore arbitrary, the joining device being positioned accordingly.

As has been seen above, the mechanical parts, especially the castor 53, the cam 37, the hammer 4, and the join roller 6, undergo significant mechanical shocks; they will therefore be selected of materials capable of withstanding these shocks, the same as the parts which support them.

In view of the significant impact imposed by the hammer 4 on the two strips to be joined, as well as the possibility of adapting the shape of the lower face 41 according to the needs and of regulating the force of impact by adjusting the position of the castor 53 relative to the cam 37, it is possible, with the device described above, to join numerous sorts of bands, both very fine and fragile bands and thin metal strips such as strips of aluminum; this device also permits the joining of strips of synthetic materials or else of materials made up of several superimposed layers. In particular, this device permits the joining of all the sorts of papers or other materials coming in strips used in the tobacco industry, this even for strips of relatively great width, and whatever the possible use of this strip may be. The main advantage is that this joining may take place without interrupting the unwinding of the strip, i.e., without loss of productivity of the manufacturing machine and with extremely simple synchronization of the cutting mechanisms. In the case of a strip including a printed motif reproduced periodically at a certain interval on at least one face, the machine will advantageously be supplemented by an additional device permitting a motif on the new strip to be located and the part of the strip where the join is situated to be eliminated so that the motifs may not be shifted for the following operations.

Air bearings are provided to guide one or both strips. An air-cushion reversing device 102 described below does not comprise any moving part liable to offer rolling resistance, causing vibrations, or requiring regular maintenance. The reversing device is principally made up of a hollow reversing element 120, fed with compressed air 110, the latter escaping through a plurality of radial holes 126 disposed on a surface portion of the reversing element in order to form an air cushion between this surface portion and a flexible strip 103 which is reversed at a certain angle by the device.

In view of its simplicity of operation, its low cost, and its performance, such a device can be advantageously used for numerous applications, but it is particularly well adapted for equipping an accumulator 111 of a strip of paper in connection with a machine for joining two strips of paper necessitating stopping of the strip for the joining.

In FIG. 6, there is a portion of the machine 1 on which a first embodiment of a reversing device or air bearing 102 according to the invention is mounted, over a surface portion of which there passes at a certain speed a strip of flexible, e.g., reserve, material 103, e.g., of paper, which can be a reserve supply or a new supply fed from a roll for use with the above-described device for joining materials while the strips are moving, and which is reversible or changes travel direction along a certain angle. The flexible reserve strip 103 is depicted here as if it were transparent in order to be able to distinguish the makeup of the reversing device 102. The latter is composed mainly of a tubular reversing element 120, the end of which is closer to the machine 1 is connected thereto by means of a connecting and fixing piece 121. An end piece 122 is fixed to the other end of the tubular reversing element 120.

As is better seen in FIG. 7A, the reversing element 120 and the connecting piece 121 are hollow; the connecting piece is fixed, according to any known manner, to the machine portion, a supply of compressed air, diagrammed at 110, being connected to the hollow part 123A of this connecting piece. A thread 124A corresponds to a tap 124B made in the hollow part 123B of the reversing element 120, so as to fix the latter on the connecting piece. Another tap 125B is made at the other end of the reversing element 120 to fix there the end piece 122 acting as a plug, by means of the thread 125A. A plurality of holes 126 are made preferably on generatrices of the reversing element 120, these generatrices being disposed below the surface of the reserve strip 103 resting on a surface portion of the reversing element 120. Thus, when the device 102 is fed with pressurized air, the latter escapes through the holes 126 between the reserve strip 103 and the surface portion of the reversing element 120 on which it rests, thus forming an air cushion which eliminates virtually completely the force of friction of the reserve strip on the reversing device. It is not absolutely necessary for the holes 126 to be aligned on generatrices of the reversing element 120 as indicated above, these holes may also be shifted from one generatrix to the next or disposed in any other suitable way on the surface portion of the reversing element 120 on which the reserve strip 103 rests, in order to form the required air cushion. According to another embodiment of the reversing element 120, depicted in FIG. 7B, its outside surface is no longer made up of rectilinear generatrices but of arcuate or parabolic generatrices in order to guide the reserve strip 103 better. FIG. 7C shows a cross-section of the reversing element 120, according to one or the other of the preceding embodiments, the holes 126 being aligned on three generatrices. It is seen in particular that for an angle of reversal or directional change of the reserve strip å, here 180 degrees, the angle between the two end generatrices is appreciably less than the angle å this relationship is always true, whatever the angle å may be. This figure also depicts a variant of the way of boring the holes 126, the hole 126 disposed at the left not being bored radially but at a certain angle, so as to be inclined toward the inside of the resting surface of the reserve strip 103 on the reversing element 120. This way of proceeding permits concentrating the air cushion better under the reserve strip 103, thus limiting air consumption. The holes 126 will generally be disposed symmetrically relative to the resting surface of the reserve strip 103 on the reversing element 120, but they may also be disposed asymmetrically, so as to compensate for an effect of the air cushion's being carried along by the reserve strip, particularly in the applications where the latter travels at high speed. The air-feed pressure, as well as the air consumption, will be determined as a function of the number of holes 126 and of their diameter, so as to permit the formation of a sufficient air cushion, the effectiveness of which depends upon the physical characteristics of the reserve strip, especially on its porosity and on its roughness, on its width as well as on its speed of passage. The optimum effectiveness of the air cushion is obtained when there is a minimum air consumption for a minimum or nil force of friction.

Preferably, the reversing device 102 is made up of three parts 120, 121, and 122 so that it can easily be dismantled and cleaned or one of the parts can easily be changed, it being possible that the mechanisms for fixing one part to another to be different from those described here. It is also possible for the device 102 to be made up of a single element or of two. The fixing and connecting piece 121 preferably includes known mechanisms permitting the orientation of the device 102 to be adjusted, so that the holes 126 may be equitably distributed under the surface of the reserve strip 103. The device 102 has been shown comprising two guide flanges 127 in order to guide the reserve strip 103 laterally, these flanges not being absolutely indispensable, in particular if the reversing element 120 has the shape shown in FIG. 7B.

Figure 8:
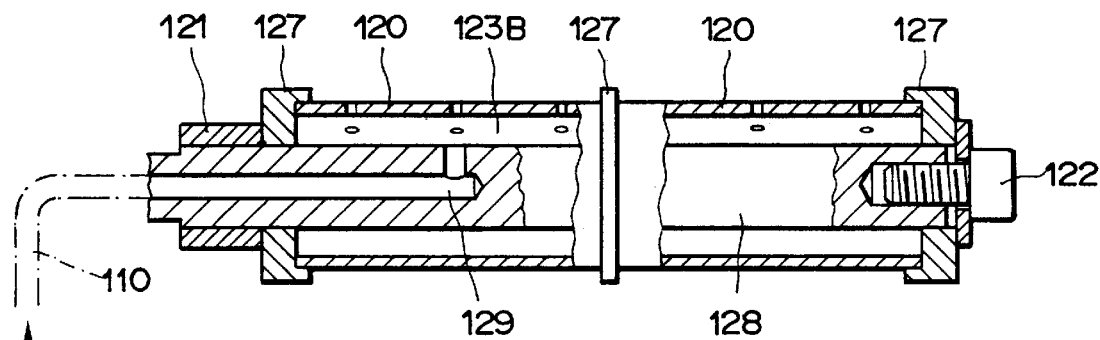
FIG. 8 shows a longitudinal section of another embodiment of a reversing device according to the invention.

Another advantage of the simplicity of design of the reversing device is seen in the embodiment shown in FIG. 8. In view of the absence of vibrations of the device in operation, it becomes possible to dispose two or even more reversing devices on the same spindle, which is very difficult with pulley-type reversing devices. The device of FIG. 8 shows two reversing elements 120 mounted side by side, separated by a guide flange 127, each further comprising another guide flange 127 on its other end. The figure also shows a variant of the air-supply mechanisms, obviously also capable of being mounted with the embodiments described previously, where a central element 128 comprises an inner duct 119 connected at one end to the air supply 110 and opening out at the other end in the hollow part 123B of the reversing elements 210.

Figure 10:
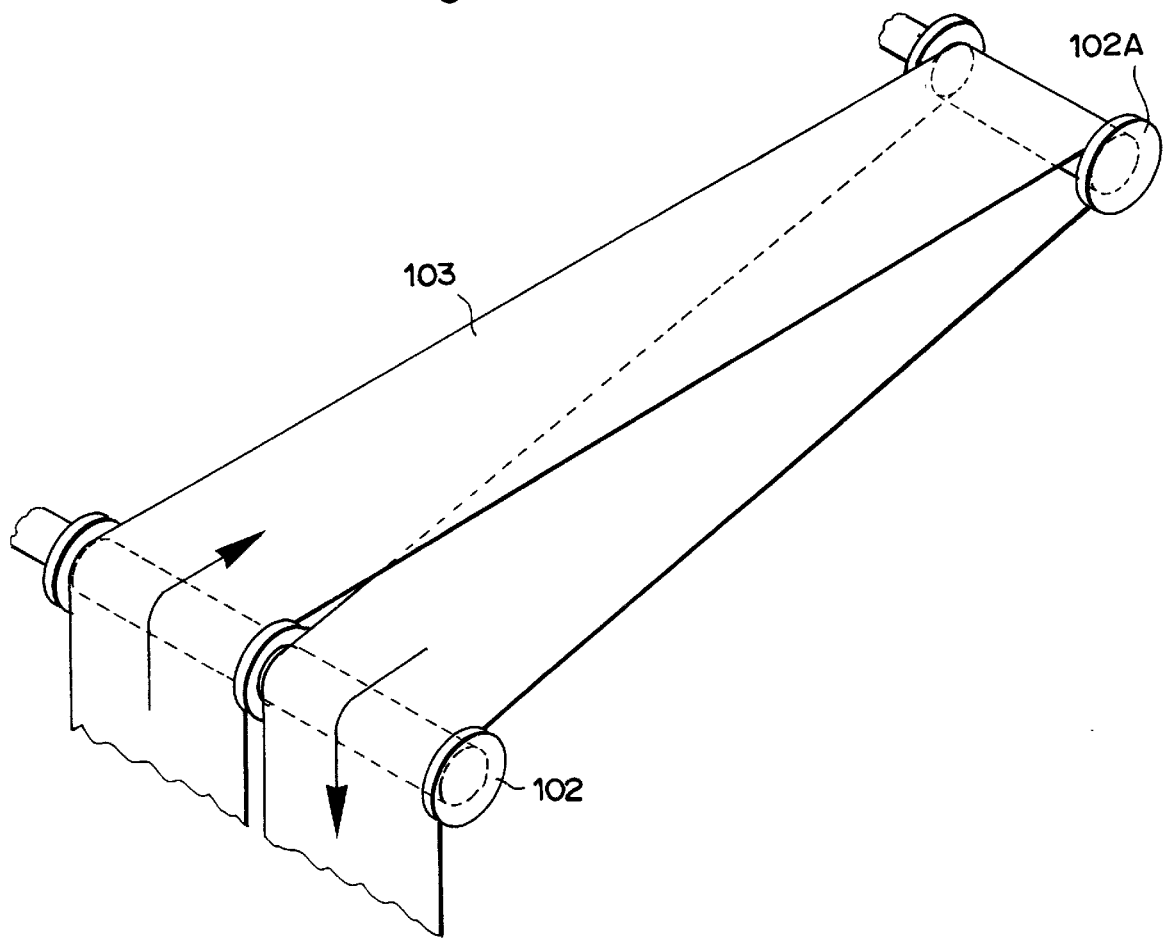
FIG. 10 shows another embodiment of a reversing device according to the invention.

As depicted in FIG. 10, it is possible to have, on two reversing elements disposed on the same spindle as above, a reserve strip passing in one direction over one of the reversing elements and in the other direction over the other element. Such an arrangement may be particularly useful when it is necessary to shift the path of travel of the web. The reversing device 102A in the figure will preferably be mounted so as to be able to move elastically away from or closer to the double reversing device 102, so as to keep the reserve strip taut.

Still another advantage of the device according to the invention, stemming from its modular construction, is that it is very easy to adapt it from one reserve strip width to another, simply by changing the reversing element 120 and possibly the central element 128.

More generally, there may be several reversing elements on the same spindle, each reversing element guiding a reserve strip, it being possible for the widths of the reserve strips, the directions, and the speeds of travel to be different on each reversing element.

This reversing device can be used for numerous applications where a moving flexible reserve strip is reversed at a certain angle; it then advantageously replaces either a reversing device made up of a fixed bar about which the reserve strip passes, a device subjecting the bar as well as the reserve strip to great wear and tear as well as offering great frictional resistance, or else a conventional reversing pulley, comprising one or more moving parts liable to cause an increase in frictional resistance and requiring regular maintenance. Even for cases where friction is not a critical value, such a reversing device can be used, in view of its simplicity.

Seeing that the reserve strip 103 does not rub directly against the reversing element 120 and therefore does not cause any wear and tear, a wear-resistant material will preferably be chosen nonetheless for this element in order to avoid the wear and tear which might be caused by the passage of dust carried along on the surface of the reserve strip turned toward said element. The material chosen will also have to permit the machining of the holes 126 having several ten's of mm. A steel or a sintered material or a ceramic or even a hard synthetic material may be suitable for this purpose.

Figure 9:
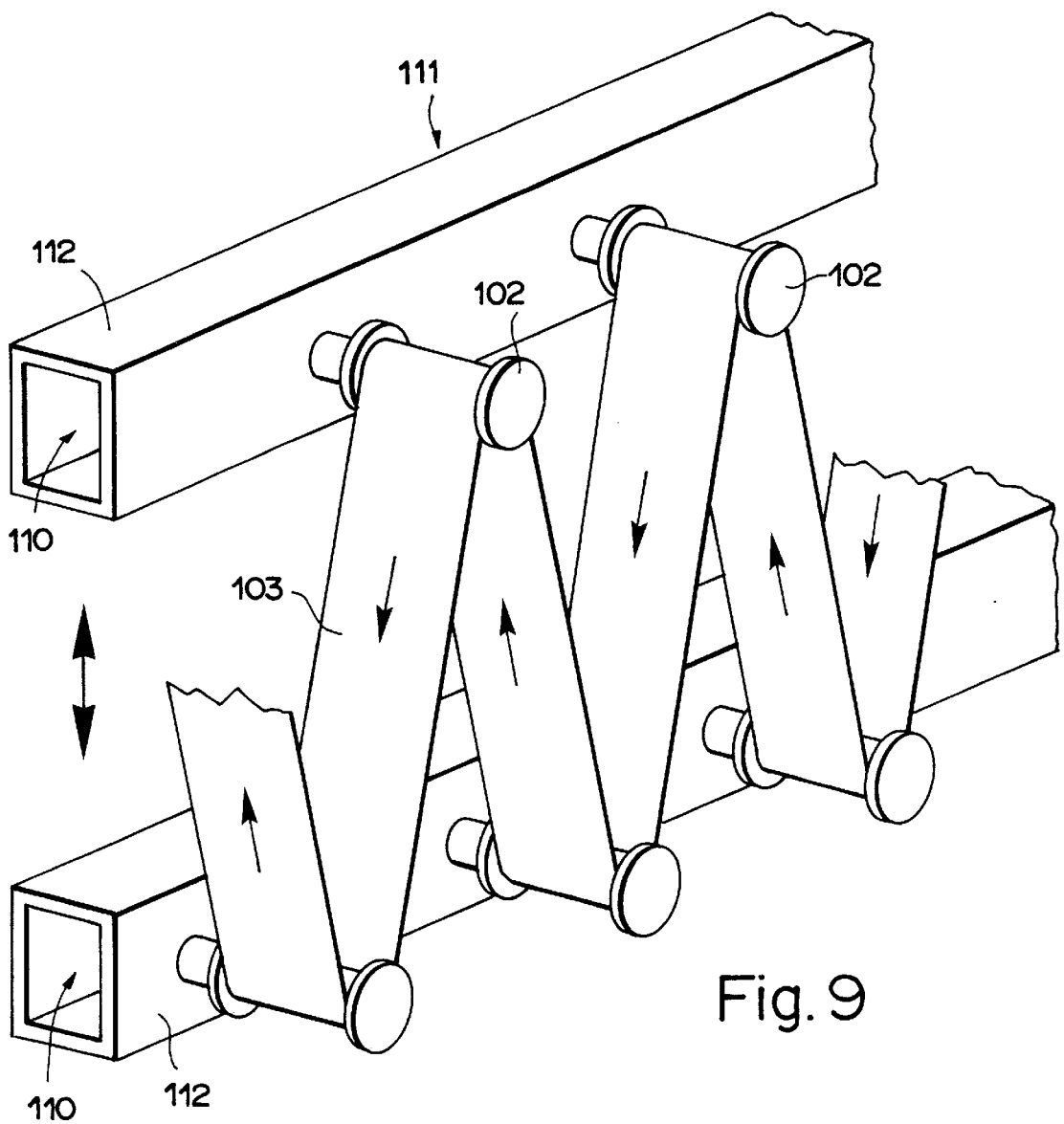
FIG. 9 shows a portion of an accumulator device according to the invention, equipped with reversing devices according to the invention.

As shown in FIG. 9, such a reversing device is particularly useful for an accumulation device 111, especially for a strip of paper, generally known in the art, composed of two frames 112 provided with reversing devices about which a reserve strip 103 travels, a strip reserve being made by moving the two frames 112 apart, hence increasing the length of the reserve strip 103 traveling in the device, this reserve being used up by moving the two frames 112 together. By equipping such an accumulation device 111 with air-cushion reversing devices 102, as described above, the friction is greatly limited, and it becomes possible to have an accumulation device comprising a sufficient number of reversing devices, without an excessive force of friction being applied to the reserve strip 103. Advantageously, each frame 112 is hollow so as to constitute at the same time the air supply 111 of each reversing device 102. As compared with the prior art accumulation devices, the one according to the invention possesses still other advantages, a lower cost, less maintenance, a time-constant force of resistance to the friction of the paper, and better guidance of the web of paper in view of the elimination of rotating elements.

Many substitutions, modifications and improvements will be apparent to the skilled artisan without departing from the spirit and scope of the present invention as described and defined herein and in the following claims.

We claim:

1. An apparatus for joining a portion of length of a first strip of a flexible material to a portion of length of a second strip of flexible material, the two strips traveling at an equivalent velocity in the same direction along approximately parallel paths and being in contact one on the other while on a peripheral surface sector of a join roller, the device comprising:

a rotatable striking arm rotating in a circular path having a direction of rotation and positioned such that the velocity of the first and second strips is tangential to the circular path in the direction of the circular path, said striking arm having a rotary support, a hollow rotation shaft, and at least one rod adapted to slide radially within the hollow of said rotary support, a radially extensible hammer fixed to one end of the rod and including a striking surface, said hammer, over a portion of the circular path of rotation of said striking arm, presenting said striking surface in immediate contacting proximity to the two strips on the join roller travelling at the same tangential speed as the velocity of the first and second strips, and a radial displacement means for selectively maintaining the location of the hammer and for extending the hammer, said radial displacement means comprising a spring for normally biasing the hammer in a retracted position, and a cam fixed to a second end of the rod opposite the first end, said cam being connected to a jack, whereby the jack displaces the rod and hammer to move the hammer to a radially extended position and the two strips over their respective portions of length between said striking surface and the join roller are compressed with contacting force by radial extension of the hammer to form joined portions.

2. An apparatus according to claim 1, wherein said striking surface comprises at least two knurled portions separated by a groove, the groove arranged in the direction of velocity of the strips upon compression.

3. An apparatus according to claim 1, wherein said striking surface comprises at least two knurled portions separated by a groove, the groove arranged perpendicularly to the direction of velocity of the strips upon compression.

4. An apparatus according to claim 1, wherein, when said hammer is retracted, said striking arm accelerates in the circular path of rotation to the same tangential speed as the velocity of the first and second strips, and wherein said radially displacing means extends said hammer when said striking arm has the same tangential speed as the velocity of the first and second strips.

5. An apparatus according to claim 1, further comprising a motor, wherein said rotation shaft is connected to said motor, said motor being capable of holding said striking arm stopped at a given angular position and of causing said striking arm to pivot at a speed such that the tangential speed of said striking surface of said hammer is equal to the velocity of the strips.

6. An apparatus according to claim 1, further comprising control means for detecting that a supply of one of the strips of flexible material is below an established amount, for controlling the speed of rotation of said striking arm so that the tangential speed of said striking surface of said hammer is equal to velocity of the two strips, for actuating the jack when the angular position of the striking arm is in a first given position, for ceasing actuation of the jack when the strips have been joined, and for stopping the rotation of said striking arm at a second given angular position.

7. An apparatus according to claim 1, further comprising a front cutting fixture for cutting an end of the first strip of flexible material in front of the joined portions of the two strips and a rear cutting fixture for cutting the end of the second strip of flexible material behind the joined portions of the two strips.

8. An apparatus according to claim 7, wherein said hammer comprises a rod portion projecting from a side face of said hammer, and wherein said rear cutting fixture comprises a second cutting blade, a second retaining spring, and at least one second lever pivoting about an axis, one portion of said second lever supporting said second cutting blade, said second cutting blade having a length least equal to the width of the strips, said second retaining spring retaining said rear cutting fixture in a retained position, one end of said second lever being actuated by the rod portion projecting from the side face of said hammer for engaging said second cutting blade across the second strip of flexible material.

9. An apparatus according to claim 7, wherein said hammer comprises a rod portion projecting from a side face of said hammer, and wherein said rear cutting fixture comprises a cutting blade, a retaining spring, and at least one lever pivoting about an axis parallel to an axis of rotation of the join roller, one portion of said lever supporting said cutting blade, said cutting blade having a length least equal to the width of the strips, said retaining spring retaining said rear cutting fixture in a retained position, one end of said lever being actuated by the rod portion projecting from the side face of said hammer for engaging said cutting blade across the second strip of flexible material.

10. Joining device according to claim 7, wherein said hammer comprises a rod portion projecting from a side face of said hammer, and wherein said rear cutting fixture comprises a cutting blade, a retaining spring, and at least one lever pivoting about an axis parallel to an axis of rotation of the join roller, one portion of said lever supporting said cutting blade, said cutting blade having a length least equal to the width of the strips, said retaining spring retaining said rear cutting fixture in a retained position, one end of said lever being actuated by the rod portion projecting from the side face of said hammer for engaging said cutting blade across the second strip of flexible material.

11. An apparatus according to claim 7, wherein said hammer comprises two opposite side faces and a front face, and said front cutting fixture comprises a first cutting blade, first retention spring and two first levers pivotable about an axis and disposed on the two side faces of said hammer, said two first levers each comprising a front end extending beyond the front face of said hammer and supporting said first cutting blade, said first cutting blade having a length at least equal to a width of the strip, said first levers each further comprising a rearward end extending beyond said striking surface of said hammer, said first retention spring retaining said front cutting fixture in a retained position, said rearward ends of said first levers contacting a contact surface of the join roller to pivot said first cutting blade and engage said first cutting blade across the first strip of flexible material.

12. An apparatus according to claim 11, wherein said first cutting blade of the rear cutting fixture is engaged across the strips when said hammer is extended.

13. An apparatus according to claim 11, wherein said second cutting blade of the rear cutting fixture is engaged across the strips when said hammer is extended.

* * * * *